United States Patent
Pandev

(10) Patent No.: US 12,474,281 B2
(45) Date of Patent: Nov. 18, 2025

(54) SEMICONDUCTOR MEASUREMENTS WITH ROBUST IN-LINE TOOL MATCHING

(71) Applicant: KLA Corporation, Milpitas, CA (US)

(72) Inventor: Stilian Ivanov Pandev, Santa Clara, CA (US)

(73) Assignee: KLA Corporation, Milpitas, CA (US)

( * ) Notice: Subject to any disclaimer, the term of this patent is extended or adjusted under 35 U.S.C. 154(b) by 508 days.

(21) Appl. No.: 17/673,594

(22) Filed: Feb. 16, 2022

(65) Prior Publication Data

US 2023/0258585 A1    Aug. 17, 2023

(51) Int. Cl.
*H01L 21/67* (2006.01)
*G01N 23/201* (2018.01)
*G06N 3/08* (2023.01)

(52) U.S. Cl.
CPC ............ *G01N 23/201* (2013.01); *G06N 3/08* (2013.01); *G01N 2223/054* (2013.01); *G01N 2223/6116* (2013.01); *H01L 21/67288* (2013.01)

(58) Field of Classification Search
CPC ............ G01N 23/201; G01N 23/203; G01N 2223/054; G01N 2223/6116;
(Continued)

(56) References Cited

U.S. PATENT DOCUMENTS 5,608,526 A    3/1997    Piwonka-Corle et al.
5,859,424 A    1/1999    Norton et al.
(Continued)

FOREIGN PATENT DOCUMENTS

CN    106352798 A   *  1/2017   ............ G01B 11/00
CN    115083937 A   *  9/2022   ....... H01L 23/49816
(Continued)

OTHER PUBLICATIONS

Lemaillet, Germer, Kline et al., "Intercomparison between optical and x-ray scatterometry measurements of FinFET structures" by Proc. SPIE, v.8681, p. 86810Q (2013).
(Continued)

*Primary Examiner* — Jeffrey P Aiello
(74) *Attorney, Agent, or Firm* — Spano Law Group

(57) ABSTRACT

Methods and systems for improved monitoring of tool drift and tool-to-tool matching across large fleets of measurement systems employed to measure semiconductor structures are presented herein. One or more Quality Control (QC) wafers are measured by each of a fleet of measurement systems. Values of system variables are extracted from the QC measurement data associated with each measurement system using a trained QC encoder. The extracted values of the system variables are employed to condition the corresponding measurement model employed by each measurement tool to characterize structures under measurement having unknown values of one or more parameters of interest. Accurate tool-to-tool matching across a fleet of conditioned measurement systems is achieved by extracting values of system variables from measurement data collected from the same set of QC wafers. Tool health is monitored based on changes in values of system variables extracted from measurements performed at different times.

20 Claims, 5 Drawing Sheets

(58) Field of Classification Search
CPC ......... G01N 2223/645; G01N 21/9501; G01N 21/47; G06N 3/0455; G06N 3/08; G06N 3/02; G06N 20/00; H01L 21/67288; H01L 21/67276; G05B 19/41875; G05B 23/024; G01R 31/318511
USPC ...... 438/14, 16, 10, 129; 700/121, 110, 109; 702/27, 188, 182, 81, 179, 189, 183, 82, 702/84, 127, 181, 185, 85
See application file for complete search history.

(56) References Cited

U.S. PATENT DOCUMENTS

| | | | |
|---|---|---|---|
| 6,023,338 | A | 2/2000 | Bareket |
| 6,429,943 | B1 | 8/2002 | Opsal et al. |
| 6,716,646 | B1 * | 4/2004 | Wright .................. H01L 22/12 257/E21.53 |
| 6,778,275 | B2 | 8/2004 | Bowes |
| 6,787,773 | B1 | 9/2004 | Lee |
| 6,992,764 | B1 | 1/2006 | Yang et al. |
| 7,242,477 | B2 | 7/2007 | Mieher et al. |
| 7,321,426 | B1 | 1/2008 | Poslavsky et al. |
| 7,406,153 | B2 | 7/2008 | Berman |
| 7,478,019 | B2 | 1/2009 | Zangooie et al. |
| 7,626,702 | B2 | 12/2009 | Ausschnitt et al. |
| 7,656,528 | B2 | 2/2010 | Abdulhalim et al. |
| 7,826,071 | B2 | 11/2010 | Shchegrov et al. |
| 7,842,933 | B2 | 11/2010 | Shur et al. |
| 7,873,585 | B2 | 1/2011 | Izikson |
| 7,929,667 | B1 | 4/2011 | Zhuang et al. |
| 7,933,026 | B2 | 4/2011 | Opsal et al. |
| 8,068,662 | B2 | 11/2011 | Zhang et al. |
| 8,138,498 | B2 | 3/2012 | Ghinovker |
| 9,291,554 | B2 | 3/2016 | Kuznetsov et al. |
| 9,471,743 | B1 * | 10/2016 | Han ...................... G06F 30/398 |
| 9,826,614 | B1 | 11/2017 | Bakeman et al. |
| 9,885,962 | B2 | 2/2018 | Veldman et al. |
| 9,915,522 | B1 | 3/2018 | Jiang et al. |
| 10,013,518 | B2 | 7/2018 | Bakeman et al. |
| 10,101,670 | B2 | 10/2018 | Pandev et al. |
| 10,152,678 | B2 * | 12/2018 | Pandev ................. G06N 20/00 |
| 10,324,050 | B2 | 6/2019 | Hench et al. |
| 10,352,695 | B2 | 7/2019 | Dziura et al. |
| 11,762,302 | B2 * | 9/2023 | Lo ........................ G03F 9/7084 430/22 |
| 2003/0021465 | A1 | 1/2003 | Adel et al. |
| 2005/0021268 | A1 * | 1/2005 | Ono ..................... G06T 7/0004 702/81 |
| 2006/0235560 | A1 * | 10/2006 | Ogawa ............. G05B 19/41875 700/121 |
| 2007/0176128 | A1 | 8/2007 | Van Bilsen et al. |
| 2007/0221842 | A1 * | 9/2007 | Morokuma ........ G01N 23/2251 250/307 |
| 2007/0225853 | A1 * | 9/2007 | Matsushita ...... G05B 19/41875 700/109 |
| 2007/0229855 | A1 * | 10/2007 | Li .......................... G01B 11/24 356/625 |
| 2008/0074677 | A1 * | 3/2008 | Willis ................. G01N 21/4788 356/601 |
| 2009/0152463 | A1 | 6/2009 | Toyoda et al. |
| 2010/0312374 | A1 * | 12/2010 | Tsai ....................... H01L 22/12 700/121 |
| 2011/0266440 | A1 | 11/2011 | Boughorbel et al. |
| 2012/0292502 | A1 | 11/2012 | Langer et al. |
| 2013/0208279 | A1 | 8/2013 | Smith |
| 2013/0304424 | A1 | 11/2013 | Bakeman et al. |
| 2014/0019097 | A1 | 1/2014 | Bakeman et al. |
| 2014/0064445 | A1 | 3/2014 | Adler |
| 2014/0111791 | A1 | 4/2014 | Manassen et al. |
| 2014/0172394 | A1 | 6/2014 | Kuznetsov et al. |
| 2014/0222380 | A1 | 8/2014 | Kuznetsov et al. |
| 2014/0297211 | A1 | 10/2014 | Pandev et al. |
| 2015/0046121 | A1 | 2/2015 | Dziura et al. |
| 2015/0110249 | A1 | 4/2015 | Bakeman et al. |
| 2015/0117610 | A1 | 4/2015 | Veldman et al. |
| 2015/0204664 | A1 | 7/2015 | Bringoltz et al. |
| 2015/0285749 | A1 | 10/2015 | Moncton et al. |
| 2015/0300965 | A1 | 10/2015 | Sezginer et al. |
| 2016/0202193 | A1 | 7/2016 | Hench et al. |
| 2016/0320319 | A1 | 11/2016 | Hench et al. |
| 2017/0167862 | A1 | 6/2017 | Dziura et al. |
| 2018/0106735 | A1 | 4/2018 | Gellineau et al. |
| 2018/0113084 | A1 | 4/2018 | Hench et al. |
| 2018/0328868 | A1 | 11/2018 | Bykanov et al. |
| 2019/0017946 | A1 | 1/2019 | Wack et al. |
| 2019/0293578 | A1 | 9/2019 | Gellineau |
| 2019/0384185 | A1 * | 12/2019 | Lo .......................... G06F 30/392 |
| 2022/0375939 | A1 * | 11/2022 | Sharma ............. H01L 29/78391 |
| 2023/0196189 | A1 * | 6/2023 | Freytag ............... G03F 7/70616 706/12 |

FOREIGN PATENT DOCUMENTS

| | | | | |
|---|---|---|---|---|
| DE | 112020002023 | T5 * | 1/2022 | ............. G01B 15/02 |
| EP | 1500996 | A2 * | 1/2005 | ........... G06T 7/0004 |

OTHER PUBLICATIONS

Kline et al., "X-ray scattering critical dimensional metrology using a compact x-ray source for next generation semiconductor devices," J. Micro/Nanolith. MEMS MOEMS 16(1), 014001 (Jan.-Mar. 2017).
International Search Report mailed on Jun. 7, 2023, for PCT Application No. PCT/US2023/012554 filed on Feb. 7, 2023 by KLA Corporation, 3 pages.

* cited by examiner

SEMICONDUCTOR MEASUREMENTS WITH ROBUST IN-LINE TOOL MATCHING

TECHNICAL FIELD

The described embodiments relate to metrology systems and methods, and more particularly to methods and systems for improved measurement of semiconductor structures.

BACKGROUND INFORMATION

Semiconductor devices such as logic and memory devices are typically fabricated by a sequence of processing steps applied to a specimen. The various features and multiple structural levels of the semiconductor devices are formed by these processing steps. For example, lithography among others is one semiconductor fabrication process that involves generating a pattern on a semiconductor wafer. Additional examples of semiconductor fabrication processes include, but are not limited to, chemical-mechanical polishing, etch, deposition, and ion implantation. Multiple semiconductor devices may be fabricated on a single semiconductor wafer and then separated into individual semiconductor devices.

Metrology processes are used at various steps during a semiconductor manufacturing process to detect defects on wafers to promote higher yield. Optical and X-ray based metrology techniques offer the potential for high throughput without the risk of sample destruction. A number of metrology based techniques including scatterometry, reflectometry, and ellipsometry implementations and associated analysis algorithms are commonly used to characterize critical dimensions, film thicknesses, composition, overlay and other parameters of nanoscale structures.

The performance, integration, and reliability of semiconductor devices have continuously improved over time due to enhanced process resolution and increasingly complex device structures. Increased process resolution enables a reduction in the minimum critical size of fabricated structures. Process resolution is primarily driven by the wavelength of the light source employed in the fabrication process. The latest Extreme Ultraviolet Lithography (EUV) light sources generate wavelengths of 13.5 nanometers; enabling fabrication of structural features smaller than 32 nanometers. In addition, more complex device structures, such as FinFET structures and vertical NAND structures, have been developed to improve overall performance, energy cost, integration level, and reliability.

As devices (e.g., logic and memory devices) move toward smaller nanometer-scale dimensions, characterization becomes more difficult. Devices incorporating complex three-dimensional geometry and materials with diverse physical properties contribute to characterization difficulty. In general, metrology systems are required to measure devices at more process steps and with higher precision.

In addition to accurate device characterization, measurement consistency across a range of measurement applications and a fleet of metrology systems tasked with the same measurement objective is also important. If measurement consistency degrades in a manufacturing environment, consistency among processed semiconductor wafers is lost and yield drops to unacceptable levels. Matching measurement results across applications and across multiple systems (i.e., tool-to-tool matching) ensures that measurement results on the same wafer for the same application yield the same result.

Systematic errors exist in each metrology tool of a fleet of metrology tools even though the hardware configuration of each metrology tool in the fleet is well calibrated. These systematic errors result in an offset in measurement results among different tools in the fleet.

In some examples, an offset value assigned to each metrology tool is added to the measurement results associated with each tool to compensate for these systematic errors. After this adjustment, measurement results monitored in a statistical process control (SPC) system are consistent across the fleet of metrology tools.

Traditionally, the offset calibration value associated with each tool is determined from measurements of a set of dedicated Quality Control (QC) wafers measured by each of the metrology tools of the fleet. The offset calibration value for each tool is evaluated based on the raw measurement data. By minimizing the effect of tool mismatch, process variations captured by measurements performed by the fleet of metrology tools is effectively magnified.

Unfortunately, in many measurement applications, offset calibration values determined from measurements of QC wafers only and applied to measurement results account for a limited subset of all differences between systems. Thus, in practice, system variations among metrology tools are not sufficiently captured by application of simple offset calibration values.

Many metrology techniques are indirect methods of measuring physical properties of a specimen under measurement. In most cases, the raw measurement signals cannot be used to directly determine the physical properties of the specimen. Instead, some type of measurement model is iteratively resolved to match the raw measurement signals. Once resolved, the measurement model is employed to estimate values of one or more parameters of interest.

In some examples, a trained machine learning based measurement model is employed to directly estimate values of parameters of interest based on raw measurement data. In these examples, a machine learning based measurement model takes raw measurement signals as model input and generates values of the parameters of interest as model output.

Machine learning based measurement models must be trained to generate useful estimates of parameters of interest for a particular measurement application. Generally, model training is based on raw measurement signals collected from specimen having known values of the parameters of interest (i.e., Design of Experiments (DOE) data). Traditionally, the machine learning based measurement model is trained by a regression process (e.g., ordinary least squares regression). A machine learning based measurement model is parameterized by a number of weight parameters. The values of the weight parameters are iteratively adjusted to minimize the differences between the known, reference values of the parameters of interest and values of the parameters of interest estimated by the machine learning based measurement model based on the measured raw measurement signals.

In some examples, each machine learning based measurement model associated with a metrology tool of a fleet of metrology tools is trained with layer specific measurement data from multiple tools in the fleet to reduce measurement sensitivity to systematic errors associated with any particular tool of the fleet of tools.

Unfortunately, in many applications, training a machine learning based measurement model associated with a particular metrology tool based on measurement data associated with multiple tools in the fleet degrades measurement performance due to correlation between critical parameters under measurement and system parameters. This is specifically a problem for measurement applications involving low sensitivity to critical parameters; where tool-to-tool differences are larger than the measurement sensitivity associated with the critical parameters.

In some examples, each machine learning based measurement model associated with a metrology tool of a fleet of metrology tools is trained using synthetically generated data having perturbations of system model parameters to reduce measurement sensitivity to systematic errors associated with any particular tool of the fleet of tools.

Unfortunately, training a machine learning based measurement model associated with a particular metrology tool based on synthetically generated data with system parameter perturbations accounts for only a limited subset of all differences between tools. In addition, in many applications, training a machine learning based measurement model associated with a particular metrology tool based on synthetically generated data with system parameter perturbations degrades measurement performance due to correlation between critical parameters under measurement and system parameters. Again, this is specifically a problem for measurement applications involving low sensitivity to critical parameters; where tool-to-tool differences are larger than the measurement sensitivity associated with the critical parameters.

As metrology systems have evolved to measure devices at more process steps and with higher precision, the tool-to-tool calibration process has become more complex and less effective. Improved methods and tools to reduce the time and cost associated with matching measurement results across a fleet of metrology tools are desired.

SUMMARY

Methods and systems for improved monitoring of tool drift and tool-to-tool matching across large fleets of measurement systems employed to measure semiconductor structures are presented herein. One or more Quality Control (QC) wafers are measured by each of a fleet of measurement systems. Values of system variables are extracted from the QC measurement data associated with each measurement system using a trained QC encoder. The extracted values of the system variables are employed to condition the corresponding measurement model employed by each measurement tool to characterize structures under measurement having unknown values of one or more parameters of interest.

Tool variations are separated from any wafer-to-wafer variations by extracting values of system variables directly from measurement data collected by each measurement system from the same set of QC wafers. In this manner, accurate tool-to-tool matching across a fleet of conditioned measurement systems is achieved.

In a further aspect, extracted values of system variables provide a monitor of tool variations over time. The health of each measurement system (e.g., drift, matching, etc.) can be monitored over time by measuring the same set of QC wafers at different times using the same trained QC encoder. In some embodiments, preventative maintenance activities are initiated based on changes in the values of the one or more system variables. In one example, a preventative maintenance activity is initiated if a difference in value of one or more system variables associated with different measurement instances exceeds a predetermined threshold value.

In another aspect, the trained layer encoder function is trained as an autoencoder. Since the same measurement signals are provided as an input and an output of the autoencoder, the information indicative of both structural and system variations is compressed into a small number of variables.

In another aspect, the trained QC encoder function is trained as an autoencoder. Since the same QC measurement signals are provided as an input and an output of the autoencoder, the information indicative of system variations is compressed into a small number of variables. In addition, since the QC measurement signals are collected from multiple tools, but from the same QC wafers, the system variables capture tool-to-tool variations without wafer variations. In this manner, the trained QC encoder is an encoder of system variables and not wafer variables.

In another aspect, the metrology tools comprising a fleet of metrology tools to be matched may include different types of metrology tools.

In another further aspect, multiple metrology tools (e.g., measurement subsystems) are employed to perform a single hybrid measurement.

The foregoing is a summary and thus contains, by necessity, simplifications, generalizations and omissions of detail; consequently, those skilled in the art will appreciate that the summary is illustrative only and is not limiting in any way. Other aspects, inventive features, and advantages of the devices and/or processes described herein will become apparent in the non-limiting detailed description set forth herein.

DETAILED DESCRIPTION

Reference will now be made in detail to background examples and some embodiments of the invention, examples of which are illustrated in the accompanying drawings.

Methods and systems for improved monitoring of tool drift and tool-to-tool matching across large fleets of measurement systems employed to measure semiconductor structures are presented herein. As described herein, one or more Quality Control (QC) wafers are measured by each of a fleet of measurement systems. The QC wafers have structures similar to structures fabricated on in-line wafers to be measured by the fleet of measurement systems. Values of system variables are extracted from the QC measurement data associated with each measurement system of the fleet using a trained QC encoder. The extracted values of the system variables associated with each measurement tool are employed as input to condition the measurement model employed by the same measurement tool to characterize structures under measurement having unknown values of one or more parameters of interest.

By extracting values of system variables directly from measurement data collected by each measurement system from the same set of QC wafers, tool variations are separated from any wafer-to-wafer variations present among in-line wafers. Thus, the values of the system variables decorrelate tool variation from variations of the structure under measurement on the wafer. By extracting system variations that are decorrelated from the structure under measurement, accurate tool-to-tool matching across a fleet of conditioned measurement systems is achieved, even when different in-line wafers are measured by each measurement tool of the fleet of measurement tools.

In addition, by extracting values of system variables directly from measurement data collected from QC wafers by each measurement system using the same trained QC encoder, tool variations are captured that would not otherwise be captured in a measurement model associated with a particular measurement tool. As a result, the system variables are decorrelated from any calibration parameters associated with the measurement model.

In a further aspect, the extracted values of the system variables provide a monitor of tool variations over time. By measuring the same set of QC wafers at different times using the same trained QC encoder, the health of each measurement system can be monitored over time (e.g., drift, matching, etc.).

Figure 1:
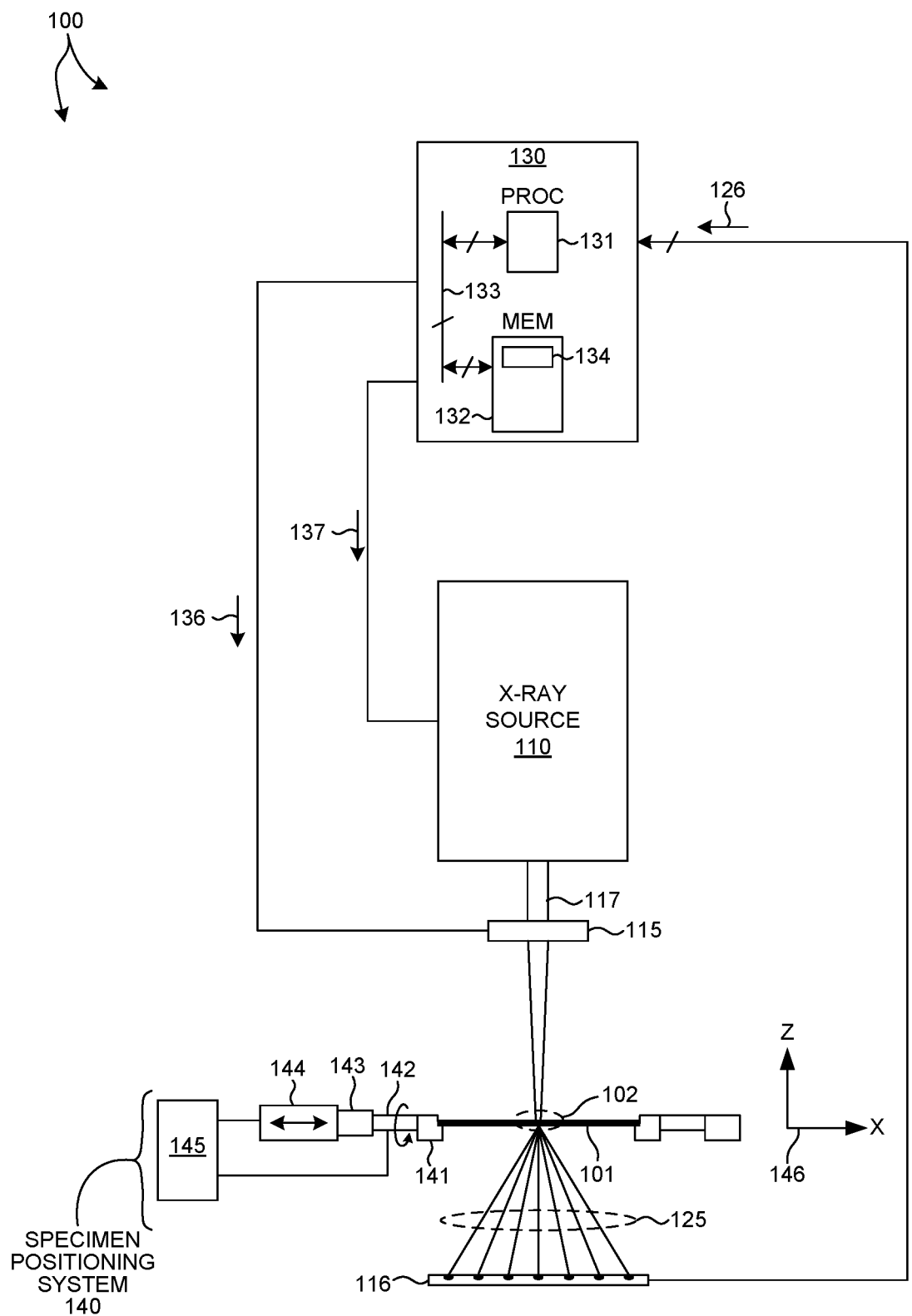
FIG. 1 is a diagram illustrative of an embodiment of a Small-Angle X-ray Scatterometry (SAXS) metrology tool for measuring characteristics of a specimen in accordance with the exemplary methods presented herein.

FIG. 1 illustrates an embodiment of a SAXS metrology tool 100 for measuring characteristics of a specimen in accordance with the exemplary methods presented herein. As shown in FIG. 1, the system 100 may be used to perform x-ray scatterometry measurements of a structure within a measurement area 102 of a specimen 101 disposed on a specimen positioning system 140. In some embodiments, the measurement area 102 has a spot size of eighty micrometers or less. In some embodiments, the measurement area 102 has a spot size of fifty micrometers or less. In some embodiments, the measurement area 102 has a spot size of forty micrometers or less.

In the depicted embodiment, SAXS metrology tool 100 includes an x-ray illumination source 110 that generates x-ray radiation suitable for x-ray scatterometry measurements. In some embodiments, the x-ray illumination source 110 generates wavelengths between 0.01 nanometers and 1 nanometer. X-ray illumination source 110 produces an x-ray beam 117 incident on inspection area 102 of specimen 101.

In general, any suitable high-brightness x-ray illumination source capable of generating high brightness x-rays at flux levels sufficient to enable high-throughput, inline metrology may be contemplated to supply x-ray illumination for x-ray scatterometry measurements as described herein. In some embodiments, an x-ray source includes a tunable monochromator that enables the x-ray source to deliver x-ray radiation at different, selectable wavelengths.

In some embodiments, one or more x-ray sources emitting radiation with photon energy greater than 15 keV are employed to ensure that the x-ray source supplies light at wavelengths that allow sufficient transmission through the entire device as well as the wafer substrate. By way of non-limiting example, any of a particle accelerator source, a liquid anode source, a rotating anode source, a stationary, solid anode source, a microfocus source, a microfocus rotating anode source, and an inverse Compton source may be employed as x-ray source 110. In one example, an inverse Compton source available from Lyncean Technologies, Inc., Palo Alto, California (USA) may be contemplated. Inverse Compton sources have an additional advantage of being able to produce x-rays over a range of photon energies, thereby enabling the x-ray source to deliver x-ray radiation at different, selectable wavelengths. Exemplary x-ray sources include electron beam sources configured to bombard solid or liquid targets to stimulate x-ray radiation. In some embodiments, x-ray illumination source 110 is a liquid metal based x-ray illumination system. A jet of liquid metal including one or more elements is generated. By way of non-limiting example, the jet of liquid metal includes any of Aluminum, Gallium, Indium, Tin, Thallium, and Bismuth. An electron beam source (e.g., electron gun) produces a stream of electrons directed by electron optics to the jet of liquid metal. Suitable electron optics include electromagnets, permanent magnets, or a combination of electromagnets and permanent magnets for focusing the electron beam and directing the beam at the liquid metal jet. The coincidence of the jet of liquid metal and the stream of electrons produces an x-ray beam 117 incident on inspection area 102 of specimen 101. In this manner, the jet of liquid metal produces x-ray lines corresponding with its constituent elements. In one embodiment, the jet of liquid metal includes a Gallium and Indium alloy.

Methods and systems for generating high brightness, liquid metal x-ray illumination are described in U.S. Pat. No. 7,929,667, issued on Apr. 19, 2011, to KLA-Tencor Corp., the entirety of which is incorporated herein by reference.

In one embodiment, the incident x-ray beam 117 is at the Indium kα line of 24.2 keV. The x-ray beam is collimated down to less than one milliradian divergence using multilayer x-ray optics for x-ray scatterometry measurements.

In some embodiments, the x-ray scattering measurements described herein are achieved without using a screen located between the x-ray source and the specimen under measurement. In these embodiments, the measured intensities of the beam over a range of angles of incidence, multiple wavelengths, or a combination of both, provide sufficient information to resolve a distribution map (i.e., image) of a desired material property (e.g., complex refractive index, electron density, or absorptivity) of the measured structure. However, in some other examples, a pinhole or another aperture is located on an otherwise opaque screen that is located between the x-ray source and the specimen under measurement to improve collimation of the x-ray beam. The intensity of the diffraction pattern is measured for several positions of the aperture. In some other embodiments, a screen with a pseudo-random aperture pattern is used, and the diffraction pattern is measured for multiple screens. These approaches may also be contemplated to provide additional information to resolve the three-dimensional distribution of the desired material property of the measured structure.

In some embodiments, the profile of the incident x-ray beam is controlled by two or more apertures, slits, or a combination thereof. In a further embodiment, the apertures, slits, or both, are configured to rotate in coordination with the orientation of the specimen to optimize the profile of the incident beam for each angle of incidence, azimuth angle, or both.

As depicted in FIG. 1, x-ray optics 115 shape and direct incident x-ray beam 117 to specimen 101. In some examples, x-ray optics 115 include an x-ray monochromator to monochromatize the x-ray beam that is incident on the specimen 101. In one example, a crystal monochromator such as a Loxley-Tanner-Bowen monochromator is employed to monochromatize the beam of x-ray radiation. In some examples, x-ray optics 115 collimate or focus the x-ray beam 117 onto inspection area 102 of specimen 101 to less than 1 milliradian divergence using multilayer x-ray optics. In some embodiments, x-ray optics 115 includes one or more x-ray collimating mirrors, x-ray apertures, x-ray beam stops, refractive x-ray optics, diffractive optics such as zone plates, specular x-ray optics such as grazing incidence ellipsoidal mirrors, polycapillary optics such as hollow capillary x-ray waveguides, multilayer optics, or systems, or any combination thereof. Further details are described in U.S. Patent Publication No. 2015/0110249, the content of which is incorporated herein by reference it its entirety.

In general, the focal plane of the illumination optics system is optimized for each measurement application. In this manner, system 100 is configured to locate the focal plane at various depths within the specimen depending on the measurement application.

X-ray detector 116 collects x-ray radiation 125 scattered from specimen 101 and generates an output signal 126 indicative of properties of specimen 101 that are sensitive to the incident x-ray radiation. In some embodiments, scattered x-rays 125 are collected by x-ray detector 116 while specimen positioning system 140 locates and orients specimen 101 to produce angularly resolved scattered x-rays.

Metrology system 100 includes one or more photon counting detectors with high dynamic range (e.g., greater than $10^5$) and thick, highly absorptive crystal substrates that absorb the direct beam (i.e., zero order beam) without damage and with minimal parasitic backscattering. Exemplary detector materials suitable for full beam x-ray scatterometry include Cadmium Telluride (CdTe), Germanium (Ge) and Gallium Arsenide (GaAs) crystals, and others. In some embodiments, the detector material is selected to provide high conversion efficiency in a narrow energy band corresponding to the source energy.

In some embodiments, a single photon counting detector detects the position and number of detected photons. In some embodiments, dual threshold detectors are employed to improve SNR.

X-ray detector 116 resolves one or more x-ray photon energies and produces signals for each x-ray energy component indicative of properties of the specimen. In some embodiments, the x-ray detector 116 includes any of a CCD array, a microchannel plate, a photodiode array, a microstrip proportional counter, a gas filled proportional counter, a scintillator, or a fluorescent material.

In this manner the X-ray photon interactions within the detector are discriminated by energy in addition to pixel location and number of counts. In some embodiments, the X-ray photon interactions are discriminated by comparing the energy of the X-ray photon interaction with a predetermined upper threshold value and a predetermined lower threshold value. In one embodiment, this information is communicated to computing system 130 via output signals 126 for further processing and storage.

A high aspect ratio, vertically manufactured structure diffracts a collimated X-ray beam into diffraction orders. Each diffraction order travels in a particular, predictable direction. The angular spacing of the diffraction orders is inversely proportional to the lattice constant of the specimen divided by the wavelength. The diffraction orders are detected by a detector array placed at some distance from the wafer. Each pixel of the detector outputs a signal that indicates the number of photons that hit the pixel.

Figure 2:
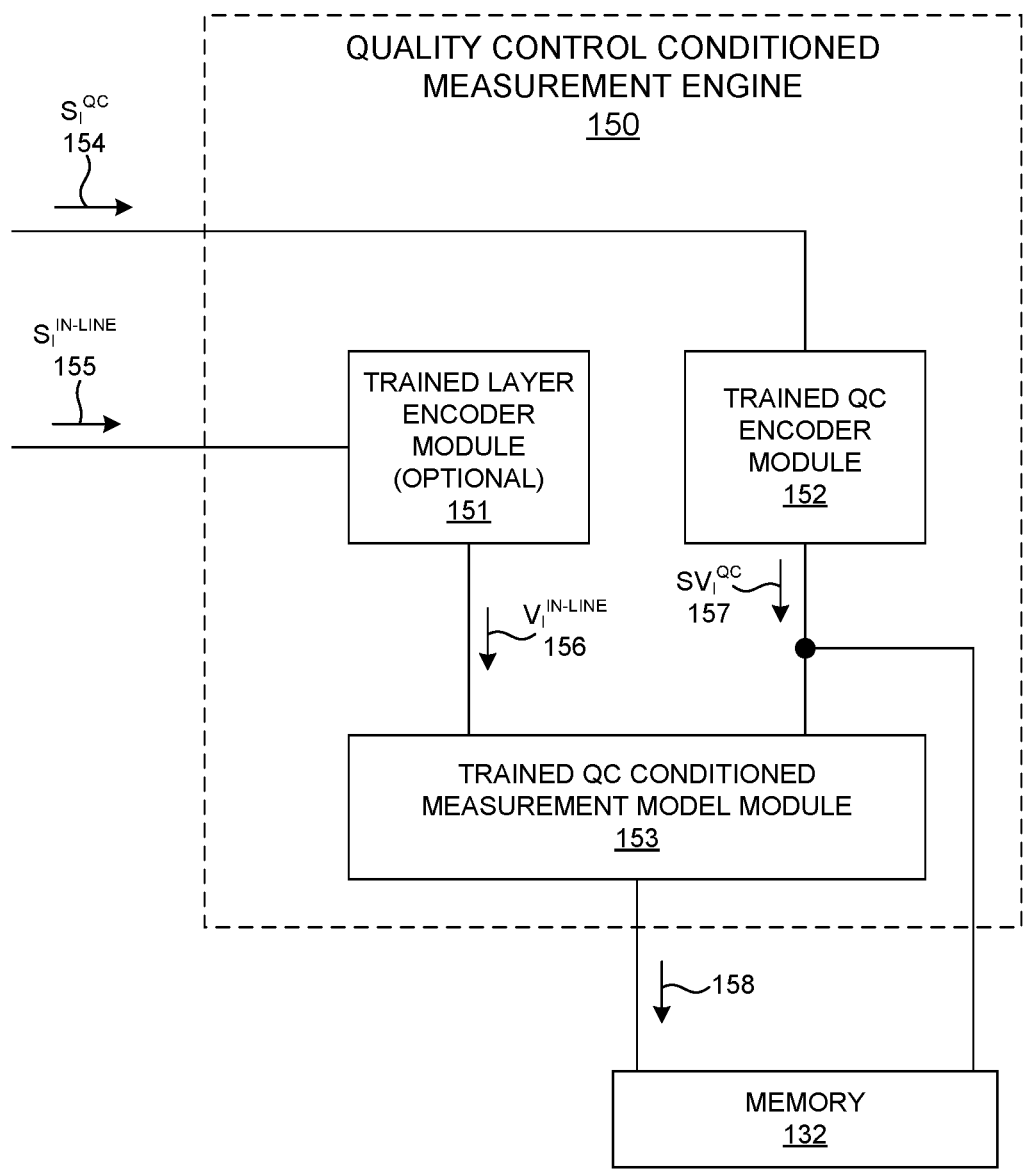
FIG. 2 is a diagram illustrative of an exemplary Quality Control (QC) conditioned measurement engine in one embodiment.

As depicted in FIG. 1, SAXS metrology system 100 includes a computing system 130 employed to acquire signals 126 generated by detector 116 and determine properties of the structure of interest based at least in part on the acquired signals. FIG. 2 depicts an illustration of an embodiment of a quality control conditioned measurement engine 150 to estimate values of one or more geometric parameters, composition parameters, or both, characterizing a complex semiconductor structure based on x-ray scatterometry measurement data associated with the complex semiconductor structure. In some embodiments, x-ray scatterometry data 126 is collected from a wafer by an x-ray scatterometry system such as metrology system 100 depicted in FIG. 1. Moreover, in some embodiments, computing system 130 is configured as a quality control conditioned measurement engine 150 as described herein.

FIG. 2 is a diagram illustrative of an exemplary quality control conditioned measurement engine 150 in one embodiment. As depicted in FIG. 2, quality control conditioned measurement engine 150 includes a trained quality control encoder module 152, a trained measurement model module 153, and optionally, a trained layer encoder module 151. Quality control conditioned measurement engine 150 estimates values of parameters of interest 158 characterizing a structure under measurement, e.g., a semiconductor structure under measurement by an X-ray based metrology system. In some embodiments, the parameters of interest include a geometric parameter of interest, a process parameter of interest, an electrical parameter of interest, a dispersion parameter of interest, etc. By way of non-limiting example, a parameter of interest may be an overlay dimension, a critical dimension, a lithographic focus, a lithographic dosage, an etch exposure time, etc.

As depicted in FIG. 2, trained layer encoder module 151 receives measurement signals, $S_i^{IN\text{-}LINE}$ 155. $S_i^{IN\text{-}LINE}$ 155 are measurement signals associated with measurements of an in-line wafer by the $i^{th}$ metrology tool of a fleet of metrology tools. In one example, $S_i^{IN\text{-}LINE}$ 155 are measurement signals associated with measurements of an in-line wafer by metrology system 100 depicted in FIG. 1. Trained layer encoder module 151 includes a trained layer encoder function that determines a set of values of one or more latent variables, $V_I^{IN\text{-}LINE}$ 156, from the in-line measurement signals, $S_i^{IN\text{-}LINE}$ 155. $V_I^{IN\text{-}LINE}$ 156 are communicated to trained measurement model module 153. The latent variables are defined by the trained latent encoder function, and are the same latent variables for all similar in-line wafers measured by metrology tools within a fleet of metrology tools, e.g., all SAXS metrology tools within a fleet of metrology tools. In this manner, the latent variables defined by the trained latent encoder function capture both system variations across the fleet of metrology tools and structure variations across an in-line wafer.

In general, trained layer encoder module 151 is optional. Trained layer encoder module 151 is employed to compress the measurement data set to a relatively small number of significant variables. However, in general, trained layer encoder module 151 may not be employed, and the trained measurement model may operate directly on measured signals, $S_I^{IN\text{-}LINE}$ 155, rather than compressed signals, $V_I^{IN\text{-}LINE}$ 156.

As depicted in FIG. 2, trained QC encoder module 152 receives measurement signals, $S_i^{QC}$ 154. $S_i^{QC}$ 154 are measurement signals associated with measurements of one or more QC wafers by the $i^{th}$ metrology tool of a fleet of metrology tools. In one example, $S_i^{QC}$ 154 are measurement signals associated with measurements of one or more QC wafers by metrology system 100 depicted in FIG. 1. Trained QC encoder module 152 includes a trained QC encoder function that determines a set of values of one or more system variables, $SV_i^{QC}$ 157, associated with the $i^{th}$ metrology tool from the QC measurement signals, $S_i^{QC}$ 154. $SV_i^{QC}$ 157 are communicated to trained measurement model module 153. The system variables are defined by the trained QC encoder function, and are the same system variables for all similar metrology tools within a fleet of metrology tools, e.g., all SAXS metrology tools within a fleet of metrology tools. In this manner, the system variables defined by the trained QC encoder function capture the system variations across the fleet of metrology tools, i.e., the system variables correspond to tool-to-tool variations.

The values of the one or more system variables, $SV_i^{QC}$ 157, are specific to the $i^{th}$ metrology tool, and are representative of the contribution by the $i^{th}$ metrology tool to system variation across the fleet of metrology tools captured by each system variable. Periodically, the one or more QC wafers are measured again by the $i^{th}$ metrology tool, e.g., every 12 hours, every 24 hours, etc. The trained QC encoder function determines an updated set of values of the one or more system variables and communicates the updated set of values of the one or more system variables to trained measurement model module 153. In this manner, the trained measurement model is conditioned by values of one or more system variables that are representative of the metrology tool in its current condition.

As depicted in FIG. 2, trained measurement model module 153 receives as inputs both the set of values of one or more system variables, $SV_i^{QC}$ 157, associated with the $i^{th}$ metrology system, and the set of values of one or more latent variables, $V_I^{IN-LINE}$ 156, associated with measurements of an in-line wafer by the $i^{th}$ metrology system. The trained measurement model of trained measurement model module 153 determines the values of one or more parameters of interest 158 (e.g., CD, SWA, HT, etc.) based on $SV_I^{Qc}$ 157 and $V_I^{IN-LINE}$ 156. The values of the parameters of interest 158 are stored in a memory, e.g., memory 132. In some embodiments, the trained measurement model is a machine learning based measurement model (e.g., linear model, neural network model such as a multiple layer perceptron model, convolutional network model, etc.).

In another aspect, changes in the values of one or more system variables are employed to monitor tool health. As depicted in FIG. 2, the values of the one or more system variables, $SV_I^{QC}$ 157, are stored in memory, e.g., memory 132. Each time the one or more QC wafers are measured by the $i^{th}$ metrology tool, the values of the one or more system variables, $SV_I^{QC}$ 157, are stored in memory, e.g., memory 132. Changes in the values of the one or more system variables are indicative of tool health, e.g., tool drift, tool component failure, etc. In some embodiments, preventative maintenance activities are initiated based on changes in the values of the one or more system variables. In one example, a preventative maintenance activity is initiated if a difference in value of one or more system variables associated with different measurement instances exceeds a predetermined threshold value.

Figure 3:
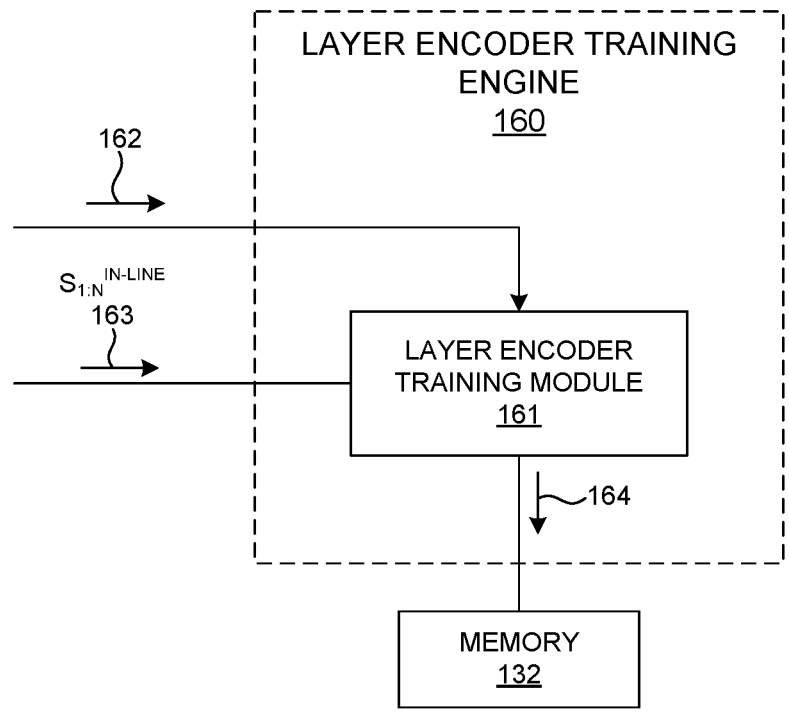
FIG. 3 is a diagram illustrative of a layer encoder training engine in one embodiment.

In another aspect, the trained layer encoder function is trained as an autoencoder as illustrated in FIG. 3. Since the same measurement signals are provided as an input and an output of the autoencoder, the information indicative of both structural and system variations is compressed into a small number of variables.

As depicted in FIG. 3, layer encoder training engine 160 includes layer encoder training module 161. Layer encoder training module 161 receives an indication 162 of a desired dimension of the parameter space to be provided as output from the trained layer encoder. For example, the dimension of the parameter space may be an integer number in a range between 1 and 100. In addition, layer encoder training module 161 receives a set of measurement signals, $S_{1:N}^{IN-LINE}$ 163, associated with measurements of one or more nominally identical in-line wafers by N different metrology tools of the fleet of metrology tools. Layer encoder training module 161 simultaneously trains an autoencoder, which maps the measurement signals, $S_{1:N}^{IN-LINE}$ 163, to a set of values of each parameter of a parameter space having the desired dimension, and a decoder, which maps the set of parameter values to a set of decoded measurement signals, $*S_{1:N}^{IN-LINE}$. The training iterates until the difference between the measurement signals, $S_{1:N}^{IN-LINE}$ 163, and the corresponding decoded measurement signals, $*S_{1:N}^{IN-LINE}$, determined by the decoder from the parameters determined by the autoencoder is minimized. The trained encoder model 164 is stored in memory, e.g., memory 132.

Figure 4:
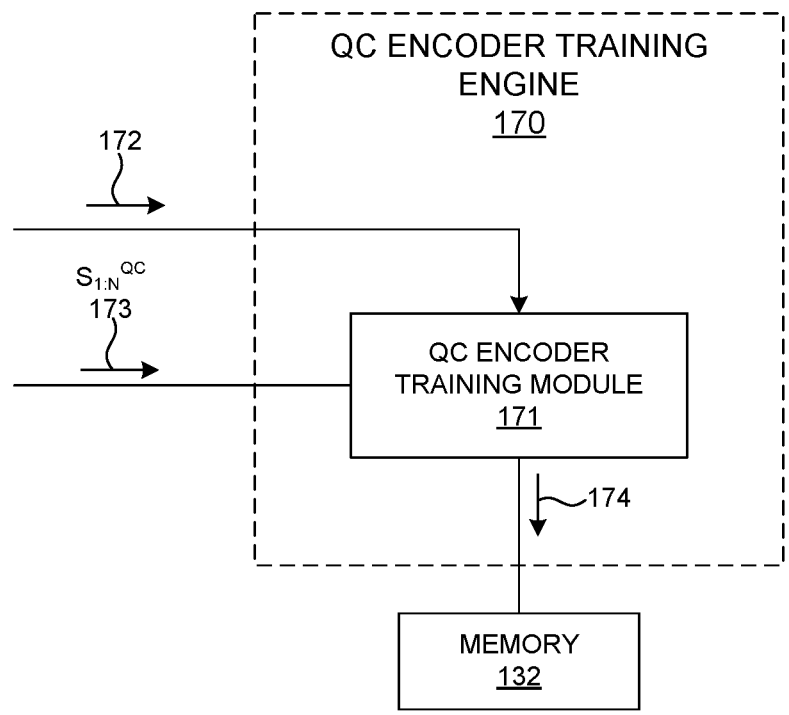
FIG. 4 is a diagram illustrative of a QC encoder training engine in one embodiment.

In another aspect, the trained QC encoder function is trained as an autoencoder as illustrated in FIG. 4. Since the same QC measurement signals are provided as an input and an output of the autoencoder, the information indicative of system variations is compressed into a small number of variables. In addition, since the QC measurement signals are collected from multiple tools, but from the same QC wafers, the system variables capture tool-to-tool variations without wafer variations. In this manner, the trained QC encoder is an encoder of system variables and not wafer variables.

As depicted in FIG. 4, QC encoder training engine 170 includes QC encoder training module 171. QC encoder training module 171 receives an indication 172 of a desired dimension of the system parameter space to be provided as output from the trained QC encoder. For example, the dimension of the parameter space may be an integer number in a range between 1 and 100. In addition, QC encoder training module 171 receives a set of measurement signals, $S_{1:N}^{QC}$ 173, associated with measurements of one or more QC wafers by each of N different metrology tools of the fleet of metrology tools. QC encoder training module 171 simultaneously trains an autoencoder, which maps the measurement signals, $S_{1:N}^{QC}$ 173, to a set of values of each parameter of a parameter space having the desired dimension, and a decoder, which maps the set of parameter values to a set of decoded measurement signals, $*S_{1:N}^{QC}$. The training iterates until the difference between the measurement signals, $S_{1:N}^{QC}$ 173, and the corresponding decoded measurement signals, $*S_{1:N}^{QC}$, determined by the decoder from the parameters determined by the autoencoder is minimized. The trained QC encoder model 174 is stored in memory, e.g., memory 132.

Although an encoder function may be determined as an autoencoder, in general, any suitable method for training an encoder as described herein is contemplated within the scope of this patent document, e.g., contrastive learning, principle component analysis, etc.

In general, a trained QC encoder model is a function that maps measurements signals to specific values of system variables. A trained QC encoder model receives measurement signals collected from the same QC wafers employed to train the QC encoder function. As described hereinbefore, a trained QC encoder model receives measurement signals collected from the QC wafers by a particular metrology system and determines values of the system variables associated with that particular metrology system at the time of measurement of the QC wafers. Furthermore, the QC wafers are measured repeatedly by the same metrology system at different instances in time and updated values of the system variables are determined using the same trained QC encoder model. The updated values of the system variables are provided as input to a trained measurement model associated with the same, particular metrology system.

In another aspect, a machine learning based QC conditioned measurement model is trained based on measurements of QC wafers and DOE wafers.

Figure 5:
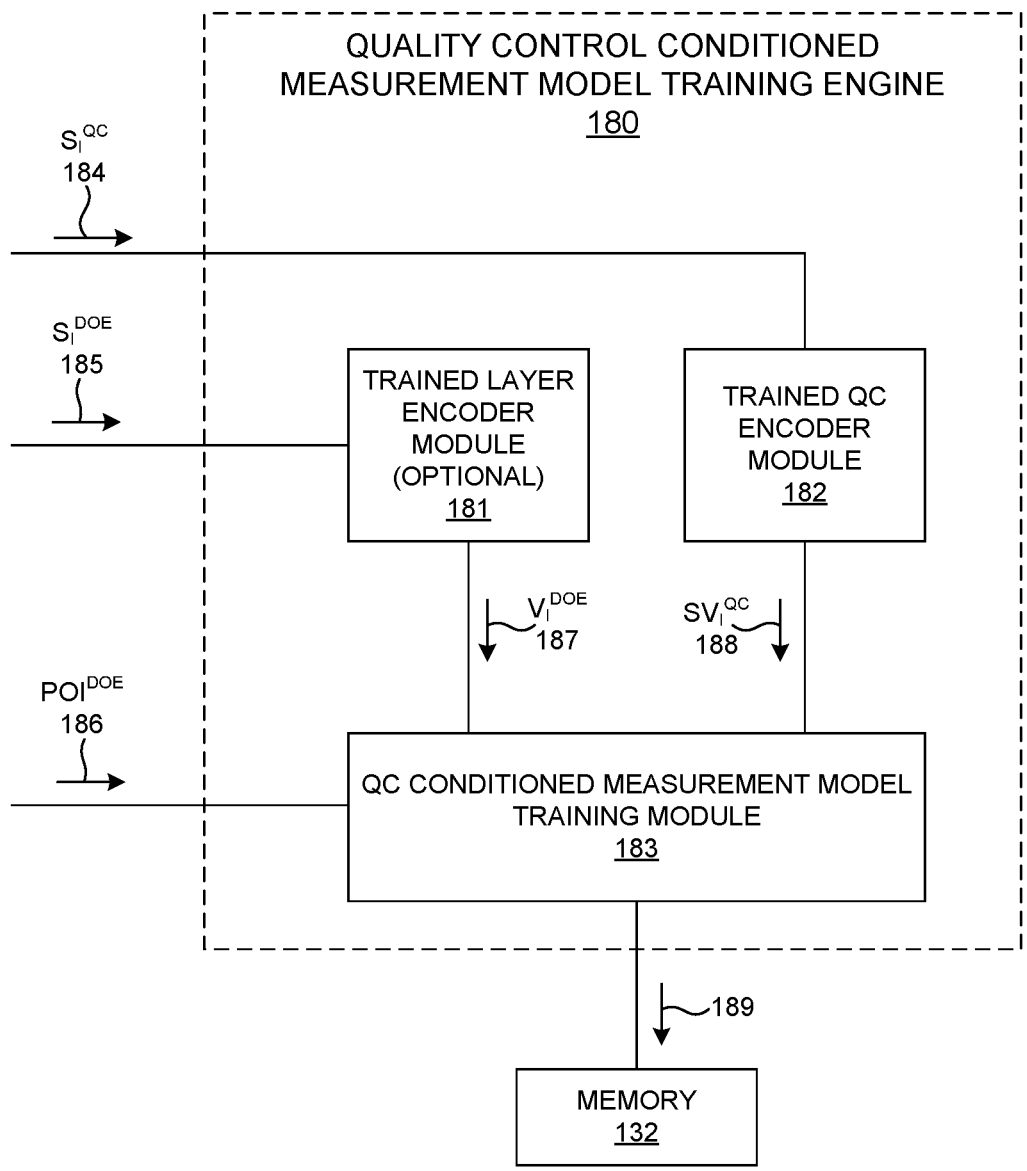
FIG. 5 is a diagram illustrative of an exemplary Quality Control (QC) conditioned measurement model training engine in one embodiment

As depicted in FIG. 5, quality control conditioned measurement model training engine 180 includes a trained QC encoder module 182, a QC conditioned measurement model training module 183, and optionally, a trained layer encoder module 181.

As illustrated in FIG. 5, trained layer encoder module 181 receives measurement signals, $S_i^{DOE}$ 185. $S_i^{DOE}$ 185 are measurement signals associated with measurements of Design Of Experiments (DOE) wafers by the $i^{th}$ metrology tool of a fleet of metrology tools. The DOE wafers are wafers having known values of one or more parameters of interest, e.g., CD, SWA, H, etc. In one example, $S_i^{DOE}$ 185 are measurement signals associated with measurements of a DOE wafer by metrology system 100 depicted in FIG. 1. Trained layer encoder module 151 includes a trained layer encoder function that determines a set of values of one or more latent variables, $V_I^{DOE}$ 187, from the DOE measurement signals, $S_i^{DOE}$ 185. $V_I^{DOE}$ 187 are communicated to QC conditioned measurement model training module 183. The latent variables are defined by the trained latent encoder function, and are the same latent variables for all similar DOE and in-line wafers measured by metrology tools within a fleet of metrology tools, e.g., all SAXS metrology tools within a fleet of metrology tools. In this manner, the latent variables defined by the trained latent encoder function capture both system variations across the fleet of metrology tools and structure variations across a DOE wafer.

In general, trained layer encoder module 151 is optional. Trained encoder module 151 is employed to compress the measurement data set to a relatively small number of significant variables. However, in general, trained layer encoder module 151 may not be employed, and the QC conditioned measurement model training module 183 may operate directly on measured signals, $S_i^{DOE}$ 185, rather than compressed signals, $V_I^{DOE}$ 187.

As depicted in FIG. 5, trained QC encoder module 182 receives measurement signals, $S_i^{QC}$ 184. $S_i^{QC}$ 184 are measurement signals associated with measurements of one or more QC wafers by the $i^{th}$ metrology tool of a fleet of metrology tools. In one example, $S_i^{QC}$ 184 are measurement signals associated with measurements of one or more QC wafers by metrology system 100 depicted in FIG. 1. Trained QC encoder module 182 includes a trained QC encoder function that determines a set of values of one or more system variables, $SV_I^{QC}$ 188, associated with the $i^{th}$ metrology tool from the QC measurement signals, $S_i^{QC}$ 184. $SV_I^{QC}$ 188 are communicated to QC conditioned measurement model training module 183. The system variables are defined by the trained QC encoder function, and are the same system variables for all similar metrology tools within a fleet of metrology tools, e.g., all SAXS metrology tools within a fleet of metrology tools. In this manner, the system variables defined by the trained QC encoder function capture the system variations across the fleet of metrology tools, i.e., the system variables correspond to tool-to-tool variations. Thus, the set of values of one or more system variables, $SV_I^{QC}$ 188, captures the contribution of the $i^{th}$ metrology tool to variation across the fleet of metrology tools for each system variable.

As depicted in FIG. 5, QC conditioned measurement model training module 183 receives both the set of values of one or more system variables, $SV_I^{QC}$ 188, associated with the $i^{th}$ metrology system, and the set of values of one or more latent variables, $V_I^{DOE}$ 187, associated with measurements of one or more DOE wafers by the $i^{th}$ metrology system. In addition, the QC conditioned measurement model training module 183 receives the known values of one or more parameters of interest, $POI^{DOE}$ 186, characterizing measured structures on one or more DOE wafers.

The QC conditioned measurement model training module 183 trains a QC conditioned measurement model 189 to predict the known values, $POI^{DOE}$ 186, based on the corresponding values of the latent variables, $V_I^{DOE}$ 187, and the set of values of one or more system variables, $SV_I^{QC}$ 188, associated with the $i^{th}$ metrology system. During training, the QC conditioned measurement model will optimize to be insensitive to system variations associated with the $i^{th}$ metrology tool because the values of the system variables are provided as known inputs to the model training process and the trained model. In this sense, system variations associated with the $i^{th}$ metrology tool are fed forward to the trained measurement model and are effectively decoupled from wafer variation during model training and subsequent application of the trained measurement model. The trained QC conditioned measurement model 189 is stored in a memory, e.g., memory 132. In some embodiments, the trained measurement model is a machine learning based measurement model (e.g., linear model, neural network model such as a multiple layer perceptron model, convolutional network model, etc.).

The QC conditioned measurement model 189 is trained by a regression process (e.g., ordinary least squares regression). The machine learning based measurement model is parameterized by a number of weight parameters. The values of the weight parameters are iteratively adjusted to minimize the differences between the known, reference values of the parameters of interest, $POI^{DOE}$ 186, and values of the parameters of interest estimated by the QC conditioned measurement model based on the values of the latent variables, $V_I^{DOE}$ 187, corresponding to the measurement signals, $S_i^{DOE}$ 185.

In general, a QC conditioned measurement model 189 is specifically trained for measurements performed by a particular type of metrology tool measuring a particular layer of an in-line wafer. Thus, a different QC conditioned measurement model 189 is trained for each layer of in-line wafers under measurement, but the same QC conditioned measurement model is employed by all metrology tools of the same type (e.g., SAXS, spectroscopic ellipsometry (SE), etc.) measuring the same layer of in-line wafers.

In another aspect, the metrology tools comprising a fleet of metrology tools to be matched as described herein, may include different types of metrology tools. For example, a fleet of five metrology tools may include three spectroscopic ellipsometery (SE) metrology tools and two SAXS metrology tools. In this example, the same QC wafer or set of QC wafers is measured by all five tools of the fleet of metrology tools, but the QC conditioned measurement model employed by all of the SE tools is trained separately from the QC conditioned measurement model employed by all of the SAXS tools.

In another further aspect, multiple metrology tools (e.g., measurement subsystems) are employed to perform a single hybrid measurement. In one example, the measurement signals associated with each metrology tool is concatenated and provided as an input to the trained encoders and measurement model as described hereinbefore. Similarly, the training of a QC conditioned measurement model employed to perform hybrid measurements is also performed with concatenated measurement signals from multiple tools.

In general, QC conditioned measurements, as described herein, may be performed by multiple metrology tools of the same type, multiple types of metrology tools, or any combination thereof. By way of non-limiting example, the types of metrology tools contemplated herein include, a spectroscopic ellipsometer, a spectroscopic reflectometer, a soft X-ray reflectometer, a small-angle x-ray scatterometer, an imaging system, a hyperspectral imaging system, a scatterometry overlay metrology system, etc.

As depicted in FIG. 1, system 100 includes a single measurement technology (i.e., SAXS). However, in general, system 100 may include any number of different measurement technologies. By way of non-limiting example, system 100 may be configured as a reflective small angle x-ray scatterometer, a soft X-ray reflectometer, spectroscopic ellipsometer (including Mueller matrix ellipsometry), a spectroscopic reflectometer, a spectroscopic scatterometer, an overlay scatterometer, an angular resolved beam profile reflectometer, a polarization resolved beam profile reflectometer, a beam profile reflectometer, a beam profile ellipsometer, any single or multiple wavelength ellipsometer, a hyperspectral imaging system, or any combination thereof. Furthermore, in general, measurement data collected by different measurement technologies and analyzed in accordance with the methods described herein may be collected from multiple tools, a single tool integrating multiple technologies, or a combination thereof.

In a further embodiment, system 100 may include one or more computing systems 130 employed to perform measurements of structures and estimate values of parameters of interest in accordance with the methods described herein. The one or more computing systems 130 may be communicatively coupled to the detector 116. In one aspect, the one or more computing systems 130 are configured to receive measurement data 126 associated with measurements of a structure under measurement (e.g., structure disposed on specimen 101).

In yet another further aspect, the measurement results described herein can be used to provide active feedback to the process tool (e.g., lithography tool, etch tool, deposition tool, etc.). For example, values of measured parameters determined based on measurement methods described herein can be communicated to an etch tool to adjust the etch time to achieve a desired etch depth. In a similar way etch parameters (e.g., etch time, diffusivity, etc.) or deposition parameters (e.g., time, concentration, etc.) may be included in a measurement model to provide active feedback to etch tools or deposition tools, respectively. In some example, corrections to process parameters determined based on measured device parameter values may be communicated to the process tool. In one embodiment, computing system 130 determines values of one or more parameters of interest. In addition, computing system 130 communicates control commands to a process controller based on the determined values of the one or more parameters of interest. The control commands cause the process controller to change the state of the process (e.g., stop the etch process, change the diffusivity, etc.). In one example, a control command causes a process controller to adjust the focus of a lithographic system, a dosage of the lithographic system, or both. In another example, a control command causes a process controller to change the etch rate to improve measured wafer uniformity of a CD parameter.

In some examples, the measurement models are implemented as an element of a SpectraShape® optical critical-dimension metrology system available from KLA-Tencor Corporation, Milpitas, California, USA. In this manner, the model is created and ready for use immediately after the spectra are collected by the system.

In some other examples, the measurement models are implemented off-line, for example, by a computing system implementing AcuShape® software available from KLA-Tencor Corporation, Milpitas, California, USA. The resulting, trained model may be incorporated as an element of an AcuShape® library that is accessible by a metrology system performing measurements.

Figure 6:
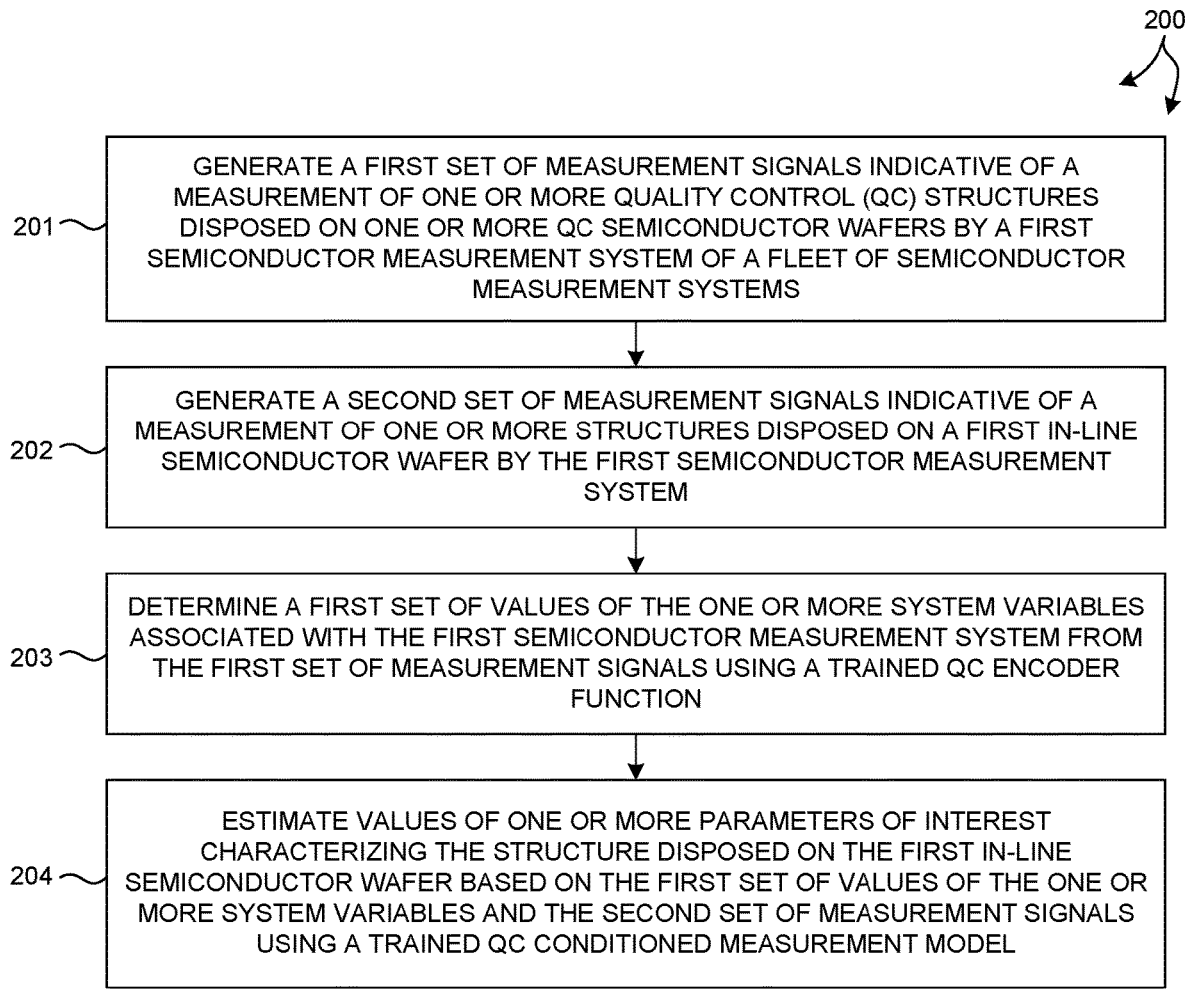
FIG. 6 illustrates a flowchart of a method 200 for estimating values of one or more parameters of interest with a trained QC conditioned measurement model in at least one novel aspect.

FIG. 6 illustrates a method 200 for estimating values of one or more parameters of interest with a trained QC conditioned measurement model in at least one novel aspect. Method 200 is suitable for implementation by a metrology system such as metrology system 100 illustrated in FIG. 1 of the present invention. In one aspect, it is recognized that data processing blocks of method 200 may be carried out via a pre-programmed algorithm executed by one or more processors of computing system 130, or any other general purpose computing system. It is recognized herein that the particular structural aspects of metrology system 100 do not represent limitations and should be interpreted as illustrative only.

In block 201, a first set of measurement signals indicative of a measurement of one or more Quality Control (QC) structures disposed on one or more QC semiconductor wafers is generated by a first semiconductor measurement system of a fleet of semiconductor measurement systems.

In block 202, a second set of measurement signals indicative of a measurement of one or more structures disposed on a first in-line semiconductor wafer is generated by the first semiconductor measurement system.

In block 203, a first set of values of the one or more system variables associated with the first semiconductor measurement system is determined from the first set of measurement signals using a trained QC encoder function.

In block 204, values of one or more parameters of interest characterizing the structure disposed on the first in-line semiconductor wafer are estimated based on the first set of values of the one or more system variables and the second set of measurement signals using a trained QC conditioned measurement model.

In a further embodiment, system 100 includes one or more computing systems 130 employed to perform measurements of semiconductor structures based on measurement data in accordance with the methods described herein. The one or more computing systems 130 may be communicatively coupled to one or more detectors, active optical elements, process controllers, etc.

It should be recognized that one or more steps described throughout the present disclosure may be carried out by a single computer system 130 or, alternatively, a multiple computer system 130. Moreover, different subsystems of system 100 may include a computer system suitable for carrying out at least a portion of the steps described herein. Therefore, the aforementioned description should not be interpreted as a limitation on the present invention but merely an illustration.

In addition, the computer system 130 may be communicatively coupled to other elements of a metrology system in any manner known in the art. For example, the one or more computing systems 130 may be coupled to computing systems associated with the detectors. In another example, the detectors may be controlled directly by a single computer system coupled to computer system 130.

The computer system 130 of system 100 may be configured to receive and/or acquire data or information from the subsystems of the system (e.g., detectors and the like) by a transmission medium that may include wireline and/or wireless portions. In this manner, the transmission medium may serve as a data link between the computer system 130 and other subsystems of system 100.

Computer system 130 of system 100 may be configured to receive and/or acquire data or information (e.g., measurement results, modeling inputs, modeling results, reference measurement results, etc.) from other systems by a transmission medium that may include wireline and/or wireless portions. In this manner, the transmission medium may serve as a data link between the computer system 130 and other systems (e.g., memory on-board system 100, external memory, or other external systems). For example, the computing system 130 may be configured to receive measurement data from a storage medium (i.e., memory 132 or an external memory) via a data link. For instance, measurement results obtained using the detectors described herein may be stored in a permanent or semi-permanent memory device (e.g., memory 132 or an external memory). In this regard, the measurement results may be imported from on-board memory or from an external memory system. Moreover, the computer system 130 may send data to other systems via a transmission medium. For instance, a measurement model or an estimated parameter value determined by computer system 130 may be communicated and stored in an external memory. In this regard, measurement results may be exported to another system.

Computing system 130 may include, but is not limited to, a personal computer system, mainframe computer system, workstation, image computer, parallel processor, or any other device known in the art. In general, the term "computing system" may be broadly defined to encompass any device having one or more processors, which execute instructions from a memory medium.

Program instructions 134 implementing methods such as those described herein may be transmitted over a transmission medium such as a wire, cable, or wireless transmission link. For example, as illustrated in FIG. 1, program instructions 134 stored in memory 132 are transmitted to processor 131 over bus 133. Program instructions 134 are stored in a computer readable medium (e.g., memory 132). Exemplary computer-readable media include read-only memory, a random access memory, a magnetic or optical disk, or a magnetic tape.

As described herein, the term "critical dimension" includes any critical dimension of a structure (e.g., bottom critical dimension, middle critical dimension, top critical dimension, sidewall angle, grating height, etc.), a critical dimension between any two or more structures (e.g., distance between two structures), and a displacement between two or more structures (e.g., overlay displacement between overlaying grating structures, etc.). Structures may include three dimensional structures, patterned structures, overlay structures, etc.

As described herein, the term "critical dimension application" or "critical dimension measurement application" includes any critical dimension measurement.

As described herein, the term "metrology system" includes any system employed at least in part to characterize a specimen in any aspect, including measurement applications such as critical dimension metrology, overlay metrology, focus/dosage metrology, and composition metrology. However, such terms of art do not limit the scope of the term "metrology system" as described herein. In addition, the system 100 may be configured for measurement of patterned wafers and/or unpatterned wafers. The metrology system may be configured as a LED inspection tool, edge inspection tool, backside inspection tool, macro-inspection tool, or multi-mode inspection tool (involving data from one or more platforms simultaneously), and any other metrology or inspection tool that benefits from the techniques described herein.

Various embodiments are described herein for a semiconductor measurement system that may be used for measuring a specimen within any semiconductor processing tool (e.g., an inspection system or a lithography system). The term "specimen" is used herein to refer to a wafer, a reticle, or any other sample that may be processed (e.g., printed or inspected for defects) by means known in the art.

As used herein, the term "wafer" generally refers to substrates formed of a semiconductor or non-semiconductor material. Examples include, but are not limited to, monocrystalline silicon, gallium arsenide, and indium phosphide. Such substrates may be commonly found and/or processed in semiconductor fabrication facilities. In some cases, a wafer may include only the substrate (i.e., bare wafer). Alternatively, a wafer may include one or more layers of different materials formed upon a substrate. One or more layers formed on a wafer may be "patterned" or "unpatterned." For example, a wafer may include a plurality of dies having repeatable pattern features.

A "reticle" may be a reticle at any stage of a reticle fabrication process, or a completed reticle that may or may not be released for use in a semiconductor fabrication facility. A reticle, or a "mask," is generally defined as a substantially transparent substrate having substantially opaque regions formed thereon and configured in a pattern. The substrate may include, for example, a glass material such as amorphous $SiO_2$. A reticle may be disposed above a resist-covered wafer during an exposure step of a lithography process such that the pattern on the reticle may be transferred to the resist.

One or more layers formed on a wafer may be patterned or unpatterned. For example, a wafer may include a plurality of dies, each having repeatable pattern features. Formation and processing of such layers of material may ultimately result in completed devices. Many different types of devices may be formed on a wafer, and the term wafer as used herein is intended to encompass a wafer on which any type of device known in the art is being fabricated.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although certain specific embodiments are described above for instructional purposes, the teachings of this patent document have general applicability and are not limited to the specific embodiments described above. Accordingly, various modifications, adaptations, and combinations of various features of the described embodiments can be practiced without departing from the scope of the invention as set forth in the claims.

What is claimed is:

1. A method comprising:
    illuminating one or more Quality Control (QC) structures disposed on one or more QC semiconductor wafers with a first amount of illumination radiation generated by an illumination source of a first semiconductor measurement system of a fleet of semiconductor measurement systems, the first amount of illumination radiation characterized by one or more physical properties;
    detecting a first amount of collected radiation from the one or more QC structures at a detector in response to the first amount of illumination radiation, the detected first amount of collected radiation dependent on the one or more physical properties of the first amount of illumination light and one or more physical characteristics of the one or more QC structures;
    illuminating one or more structures disposed on one or more in-line semiconductor wafers with a second amount of illumination radiation generated by the illumination source of the first semiconductor measurement system of the fleet of semiconductor measurement systems, the second amount of illumination radiation characterized by the one or more physical properties;
    detecting a second amount of collected radiation from the one or more structures at the detector in response to the second amount of illumination radiation, the detected second amount of collected radiation dependent on the one or more physical properties of the second amount of illumination light and one or more physical characteristics of the one or more structures;
    generating a first set of measurement signals indicative of the detected first amount of collected radiation;
    generating a second set of measurement signals indicative of the detected second amount of collected radiation;
    determining a first set of values of one or more system variables associated with the first semiconductor measurement system from the first set of measurement signals using a trained QC encoder function; and
    estimating values of one or more parameters of interest characterizing the structure disposed on the first in-line semiconductor wafer based on the first set of values of the one or more system variables and the second set of measurement signals using a trained QC conditioned measurement model.

2. The method of claim 1, further comprising:
    generating a third set of measurement signals indicative of a measurement of one or more Design Of Experiments (DOE) structures disposed on one or more DOE semiconductor wafers by the first semiconductor measurement system of the fleet of semiconductor measurement systems, wherein values of the one or more parameters of interest characterizing the one or more DOE structures disposed on the one or more DOE semiconductor wafers are known; and
    training the QC conditioned measurement model based on the first set of values of the one or more system variables and the third set of measurement signals.

3. The method of claim 2, wherein the trained QC conditioned model is a machine learning based model.

4. The method of claim 1, further comprising:
    generating a third set of measurement signals indicative of a measurement of the one or more Quality Control (QC) structures disposed on the one or more QC semiconductor wafers by each semiconductor measurement system of the fleet of semiconductor measurement systems; and
    training the QC encoder function based on the third set of measurement signals.

5. The method of claim 4, wherein the training of the QC encoder function involves any of an autoencoder, a principle component analysis, and contrastive learning.

6. The method of claim 1, further comprising:
    generating a third set of measurement signals indicative of a measurement of the one or more Quality Control (QC) structures disposed on the one or more QC semiconductor wafers by the first semiconductor measurement system of the fleet of semiconductor measurement systems at a time subsequent to the generating of the first set of measurement signals; and
    determining a second set of values of the one or more system variables associated with the first semiconductor measurement system from the third set of measurement signals using the trained QC encoder function.

7. The method of claim 6, further comprising:
    generating a fourth set of measurement signals indicative of a measurement of one or more structures disposed on a second in-line semiconductor wafer by the first semiconductor measurement system; and
    estimating values of one or more parameters of interest characterizing the structure disposed on the second in-line semiconductor wafer based on the second set of values of the one or more system variables and the fourth set of measurement signals using the trained QC conditioned measurement model.

8. The method of claim 6, further comprising:
    estimating a difference between the first set of values of the one or more system variables and the second set of values of one or more of the system variables.

9. The method of claim 8, further comprising:
    performing a preventative maintenance operation if the difference exceeds a predetermined threshold value.

10. The method of claim 1, wherein each of the semiconductor measurement systems of the fleet of semiconductor measurement systems is any of a spectroscopic ellipsometer, a spectroscopic reflectometer, a soft X-ray reflectometer, a small-angle x-ray scatterometer, an imaging system, a hyperspectral imaging system, and a scatterometry overlay metrology system.

11. The method of claim 1, wherein the first set of measurement signals includes measurement data associated with measurements of the one or more QC structures by a plurality of semiconductor measurement systems of the fleet of semiconductor measurement systems, and wherein the second set of measurement signals includes measurement data associated with measurements of the one or more structures by the plurality of semiconductor measurement systems of the fleet of semiconductor measurement systems.

12. A system comprising:
a first semiconductor measurement system of a fleet of semiconductor measurement systems, comprising:
an illumination source configured to generate a first amount of illumination radiation illuminating one or more Quality Control (QC) structures disposed on one or more QC semiconductor wafers with a first amount of illumination radiation, the first amount of illumination radiation characterized by one or more physical properties, the first illumination source further configured to generate a second amount of illumination radiation illuminating one or more structures disposed on one or more in-line semiconductor wafers, the second amount of illumination radiation characterized by the one or more physical properties-;
a first detector configured to detect a first amount of collected radiation from the one or more QC structures at the detector in response to the first amount of illumination radiation, the detected first amount of collected radiation dependent on the one or more physical properties of the first amount of illumination light and one or more physical characteristics of the one or more QC structures, the first detector further configured to generate a first set of measurement signals indicative of the detected first amount of collected radiation, the first detector further configured to detect a second amount of collected radiation from the one or more structures at the detector in response to the second amount of illumination radiation, the detected second amount of collected radiation dependent on the one or more physical properties of the second amount of illumination light and one or more physical characteristics of the one or more structures, the first detector further configured to generate a second set of measurement signals indicative of the detected second amount of collected radiation; and
one or more computer systems configured to:
determine a first set of values of the one or more system variables associated with the first semiconductor measurement system from the first set of measurement signals using a trained QC encoder function; and
estimate values of one or more parameters of interest characterizing the structure disposed on the first in-line semiconductor wafer based on the first set of values of the one or more system variables and the second set of measurement signals using a trained QC conditioned measurement model.

13. The system of claim 12, the one or more computer systems further configured to:
receive a third set of measurement signals indicative of a measurement of one or more Design Of Experiments (DOE) structures disposed on one or more DOE semiconductor wafers by the first semiconductor measurement system of the fleet of semiconductor measurement systems, wherein values of the one or more parameters of interest characterizing the one or more DOE structures disposed on the one or more DOE semiconductor wafers are known; and
train the QC conditioned measurement model based on the first set of values of the one or more system variables and the third set of measurement signals.

14. The system of claim 12, the one or more computer systems further configured to:
generate a third set of measurement signals indicative of a measurement of the one or more Quality Control (QC) structures disposed on the one or more QC semiconductor wafers by each semiconductor measurement system of the fleet of semiconductor measurement systems; and
train the QC encoder function based on the third set of measurement signals.

15. The system of claim 12, the one or more computer systems further configured to:
receive a third set of measurement signals indicative of a measurement of the one or more Quality Control (QC) structures disposed on the one or more QC semiconductor wafers by the first semiconductor measurement system of the fleet of semiconductor measurement systems at a time subsequent to the generating of the first set of measurement signals; and
determine a second set of values of the one or more system variables associated with the first semiconductor measurement system from the third set of measurement signals using the trained QC encoder function.

16. The system of claim 15, the one or more computer systems further configured to:
receive a fourth set of measurement signals indicative of a measurement of one or more structures disposed on a second in-line semiconductor wafer by the first semiconductor measurement system; and
estimate values of one or more parameters of interest characterizing the structure disposed on the second in-line semiconductor wafer based on the second set of values of the one or more system variables and the fourth set of measurement signals using the trained QC conditioned measurement model.

17. The system of claim 15, the one or more computer systems further configured to:
estimate a difference between the first set of values of the one or more system variables and the second set of values of one or more of the system variables.

18. The system of claim 17, wherein a preventative maintenance operation is performed if the difference exceeds a predetermined threshold value.

19. The system of claim 12, wherein each of the semiconductor measurement systems of the fleet of semiconductor measurement systems is any of a spectroscopic ellipsometer, a spectroscopic reflectometer, a soft X-ray reflectometer, a small-angle x-ray scatterometer, an imaging system, a hyperspectral imaging system, and a scatterometry overlay metrology system.

20. A system comprising:
a first semiconductor measurement system of a fleet of semiconductor measurement systems, comprising:
an illumination source configured to generate a first amount of illumination radiation illuminating one or more Quality Control (QC) structures disposed on one or more QC semiconductor wafers with a first amount of illumination radiation, the first amount of illumination radiation characterized by one or more physical properties, the first illumination source further configured to generate a second amount of illumination radiation illuminating one or more structures disposed on one or more in-line semiconductor wafers, the second amount of illumination radiation characterized by the one or more physical properties;

a first detector configured to detect a first amount of collected radiation from the one or more QC structures at the detector in response to the first amount of illumination radiation, the detected first amount of collected radiation dependent on the one or more physical properties of the first amount of illumination light and one or more physical characteristics of the one or more QC structures, the first detector further configured to generate a first set of measurement signals indicative of the detected first amount of collected radiation, the first detector further configured to detect a second amount of collected radiation from the one or more structures at the detector in response to the second amount of illumination radiation, the detected second amount of collected radiation dependent on the one or more physical properties of the second amount of illumination light and one or more physical characteristics of the one or more structures, the first detector further configured to generate a second set of measurement signals indicative of the detected second amount of collected radiation; and a non-transitory, computer-readable medium storing computer-readable instructions, the computer-readable instructions, when executed by the one or more processors, cause the computing system to:
  determine a first set of values of one or more system variables associated with the first semiconductor measurement system from the first set of measurement signals using a trained QC encoder function; and
  estimate values of one or more parameters of interest characterizing the structure disposed on the first in-line semiconductor wafer based on the first set of values of the one or more system variables and the second set of measurement signals using a trained QC conditioned measurement model.

* * * * *